US010250741B2

United States Patent
Feast et al.

(10) Patent No.: US 10,250,741 B2
(45) Date of Patent: *Apr. 2, 2019

(54) SYSTEMS AND METHODS FOR MANAGING, ANALYZING AND PROVIDING VISUALIZATIONS OF MULTI-PARTY DIALOGS

(71) Applicant: Cogito Corporation, Boston, MA (US)

(72) Inventors: Joshua Feast, Boston, MA (US); Ali Azarbayejani, Boston, MA (US); Skyler Place, Boston, MA (US)

(73) Assignee: Cogito Corporation, Boston, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/598,188

(22) Filed: May 17, 2017

(65) Prior Publication Data

US 2017/0257481 A1    Sep. 7, 2017

Related U.S. Application Data

(63) Continuation of application No. 15/264,436, filed on Sep. 13, 2016, now Pat. No. 9,661,130.

(Continued)

(51) Int. Cl.
*H04M 3/22* (2006.01)
*H04M 11/00* (2006.01)
(Continued)

(52) U.S. Cl.
CPC .......... *H04M 3/2281* (2013.01); *G10L 25/03* (2013.01); *G10L 25/72* (2013.01); *H04M 3/2218* (2013.01);
(Continued)

(58) Field of Classification Search
CPC .... H04H 60/33; H04H 60/66; G06Q 30/0282; G06Q 10/10; G06N 17/30412;
(Continued)

(56) References Cited

U.S. PATENT DOCUMENTS 7,280,041 B2    10/2007    Ryou
7,813,931 B2 *  10/2010    Hetherington .......... G10L 21/02
                                                       704/205

(Continued)

FOREIGN PATENT DOCUMENTS

WO    WO-2008/039031 A1    4/2008
WO    WO-2017/048729 A1    3/2017

OTHER PUBLICATIONS

International Search Report, PCT/US2016/051548, 3 pages, dated Dec. 13, 2016.

(Continued)

*Primary Examiner* — Binh Kien Tieu
(74) *Attorney, Agent, or Firm* — Choate, Hall & Stewart LLP; William R. Haulbrook; Alexander D. Augst

(57) ABSTRACT

Systems and methods are provided for managing and analyzing multi-party dialogs (e.g., calls) between communication devices. A digital connection is established with each of a plurality of communication devices. The connection is switched between the communication devices from a POTS connection to digital connections, enabling the communication devices to communicate with each other via the computing device over the digital connections. Audio signals are part of a multi-party dialog between users of the plurality of communication devices. The received audio signals are split into corresponding first signals and second signals. The first signals are transmitted to the plurality of communication devices and are analyzed to produce measurements of features of the second signals. Feedback data is transmitted to at least one of the plurality of communication devices.

17 Claims, 16 Drawing Sheets

Related U.S. Application Data

(60) Provisional application No. 62/218,488, filed on Sep. 14, 2015.

(51) Int. Cl.
  *H04M 3/42* (2006.01)
  *H04M 13/00* (2006.01)
  *H04M 3/56* (2006.01)
  *G10L 25/72* (2013.01)
  *G10L 25/03* (2013.01)
  *H04M 7/00* (2006.01)

(52) U.S. Cl.
  CPC .......... *H04M 3/2227* (2013.01); *H04M 3/562* (2013.01); *H04M 13/00* (2013.01); *H04M 7/0069* (2013.01); *H04M 2203/355* (2013.01); *H04M 2250/16* (2013.01)

(58) Field of Classification Search
  CPC ............... G06N 17/27; G06N 17/2785; G06N 17/3053; G06N 3/0445; G06N 7/152; G06L 25/63; G06L 15/265
  USPC ......... 379/32.01, 32.02, 32.04, 93.07, 93.09, 379/93.11, 93.14, 93.17, 93.21, 93.23, 379/201.01, 202.01, 205.01
  See application file for complete search history.

(56) References Cited

U.S. PATENT DOCUMENTS

| | | | |
|---|---|---|---|
| 8,386,591 B2 * | 2/2013 | Haag | H04Q 11/0442 370/352 |
| 8,675,829 B1 | 3/2014 | Coughlan et al. | |
| 8,965,770 B2 | 2/2015 | Petrushin | |
| 9,336,268 B1 | 5/2016 | Moudy et al. | |
| 9,661,130 B2 | 5/2017 | Feast et al. | |
| 2005/0280545 A1 | 12/2005 | Ryou | |
| 2011/0299674 A1 | 12/2011 | Rodman et al. | |
| 2012/0208165 A1 | 8/2012 | Levaniemi et al. | |
| 2013/0080348 A1 | 3/2013 | Pantaliano et al. | |
| 2014/0018097 A1 | 1/2014 | Goldstein | |
| 2014/0118470 A1 * | 5/2014 | Kato | H04N 7/15 348/14.08 |
| 2015/0032658 A1 | 1/2015 | Pantaliano et al. | |
| 2015/0264177 A1 | 9/2015 | Feast et al. | |
| 2015/0348570 A1 | 12/2015 | Feast et al. | |
| 2015/0381930 A1 * | 12/2015 | Quinn | H04N 7/147 348/14.14 |
| 2016/0163333 A1 | 6/2016 | Totzke et al. | |
| 2016/0300135 A1 | 10/2016 | Moudy et al. | |
| 2017/0078479 A1 | 3/2017 | Feast et al. | |

OTHER PUBLICATIONS

Written Opinion, PCT/US2016/051548, 8 pages, dated Dec. 13, 2016.

* cited by examiner

```
Activation model specification
id: ''
type: RegressionModel<irregular>
param:
  intercept: 18.3868514
  sigmoidTransform: 1.0
  classify: 0.0e+00
  weights:
  - 4.3671959
  - 11.3869987
  - -0.7519621
  - -0.7357225
consume:
  FLOAT32:
    FEATURE_0: f_meanHarm
    FEATURE_1: f_meanPitchVariation
    FEATURE_2: f_meanMFCC01
    FEATURE_3: f_stdevMFCC01
produce:
  OUTPUT: ''
```

FIG. 11A

```
Valence model specification
id: ''
type: RegressionModel<irregular>
param:
  intercept: -10.6586693
  sigmoidTransform: 1.0
  classify: 0.0e+00
  weights:
  - 45.1660444
  - 27.0877543
  - 6.1840707
  - 0.3112303
consume:
  FLOAT32:
    FEATURE_0: f_meanEnvPeaks
    FEATURE_1: f_stdevVocalEffort0
    FEATURE_2: f_stdevVocalEffort1
    FEATURE_3: f_meanMFCC01
produce:
  OUTPUT: ''
```

FIG. 11B

SYSTEMS AND METHODS FOR MANAGING, ANALYZING AND PROVIDING VISUALIZATIONS OF MULTI-PARTY DIALOGS

CROSS REFERENCE TO RELATED APPLICATIONS

This application is a continuation application of U.S. patent application Ser. No. 15/264,436, filed Sep. 13, 2016, (now U.S. Pat. No. 9,661,130), which claims priority to and the benefit of U.S. Provisional Patent Application Ser. No. 62/218,488, filed Sep. 14, 2015, entitled "Systems and Methods for Managing, Analyzing and Providing Visualizations of Multi-Party Dialogs," the disclosures of each of which are incorporated herein by reference in their entireties.

FIELD OF THE INVENTION

This invention generally relates to multi-party dialogs, and more particularly to systems and methods for managing, analyzing and providing visualizations of multi-party dialogs.

BACKGROUND

The interconnected world has allowed individuals who have become dispersed throughout the globe to communicate with one another from afar. While individuals communicate over e-mail, chat, social media and the like, many prefer or require oral or audio communications over telephone, voice chat, cell phones, voice over interne protocol (VoIP) systems and the like. These types of communications provide a number of advantages, including the ability to communicate in real time and to covey emotions, urgency and the like by modifying non-lexical aspects of one's speech.

In fact, the ability to engage in audio communications has been facilitated by the advancement of computers and mobile devices. Individuals are now able to communicate from almost any location with any number of individuals. For example, a sales team leader in Boston may be able to initiate a conference call with his team participating from a conference room in New York and with a potential client joining from a landline telephone in Los Angeles.

Audio communications are used by individuals in a variety of roles such as clients, customers, vendors, agents, therapists, clinicians, patients, mediators, interviewers, interviewees, friends, families, instructors, students, and the like. Often, these communications necessitate a heightened level of precision and attention to detail.

There is a need therefore for systems and methods for managing multi-party dialogs and providing analysis and visualization feedback regarding the dialog.

SUMMARY

Systems and methods are presented herein for managing, analyzing and providing visualizations of multi-party dialogs.

In one aspect, the invention is directed to a method for managing and analyzing multi-party dialogs (e.g., call) between communication devices, the method comprising: receiving, by a processor of a computing device (e.g., hosted system, server), digital (e.g., VoIP) connection requests from a plurality of communication devices (e.g., phone, computer, mobile device), the communication devices being connected over a plain old telephone service (POTS) connection; establishing, by the processor, a digital connection with each of the plurality of communication devices; performing, by the processor, one or more tests on the plurality of communication devices; switching, by the processor, the connection between the communication devices from the POTS connection to the digital connections, enabling the communication devices to communicate with each other via the computing device (server) over the digital connections; receiving, by the processor, audio signals from at least a portion of the plurality of communication devices, the audio signals being part of a multi-party dialog between users of the plurality of communication devices; splitting, by the processor, the received audio signals into corresponding first signals and second signals; transmitting, by the processor, the first signals to the plurality of communication devices of the digital connections in the form of audio to be output by each of the communication devices; analyzing, by the processor, the second signals to produce measurements of features of the second signals (e.g., a measure of distress, activation, valence, pace/speed, dynamic variation, vocal effort, tone, depressed tone, and/or tension); and transmitting, by the processor, to at least one of the plurality of communication devices, feedback data comprising at least a portion of the measurements of features of the second signals, the feedback data contextualizing each of the participation of the users of the plurality of communication devices during the multi-party dialog.

In certain embodiments, the audio signals include speech spoken by the users of the plurality of communication devices and are received in real-time (e.g., at approximately the same time, within 1 second, 5 seconds, 10 seconds) as they are spoken by the users during the multi-party dialog. In certain embodiments, the steps of receiving the audio signals, splitting the audio signals, transmitting the first signals to the plurality of communication devices, analyzing the second signals, and transmitting the feedback data are performed in real-time (e.g., at approximately the same time, within 1 second, 5 seconds, 10 seconds).

In certain embodiments, the measurements of features of each of the second signals include one or more of: (i) a measure of pace (e.g., "speaking rate") or articulation rate at which the user associated with the second signal has spoken over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (ii) a measure of tone (e.g., "dynamic variation") with which the user associated with the second signal has spoken over an interval of tiime (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (iii) a measure of vocal effort with which the user associated with the second signal has spoken over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (iv) a measure of amount of time the user associated with the second signal has spoken over an interval of time (e.g., a running measure over the previous minute, or the previous 2 minutes, or the previous 5 minutes, or the previous 10 minutes, or the previous 15 minutes, and/or since the beginning of the communication, etc.); and/or (v) a measure of perceived depressed tone with which the user associated with the second signal has spoken over an interval of time (e.g., a running measure over the previous minute, or the previous 2 minutes, or the previous 5 minutes, or the previous 10 minutes, or the previous 15 minutes, and/or since the beginning of the communication, etc.).

In certain embodiments, transmitting the feedback data comprising the at least a portion of the measurements of features includes causing graphical user interface widgets to be rendered at the at least one of the plurality of communication devices, each of the graphical user interface widgets including the at least a portion of the measurements of features in association with the user of the corresponding communication device. In certain embodiments, the graphical user interface widgets caused to be rendered at one of the plurality of communication devices display the measurements of features of the second signals of the audio signals received from the one of the plurality of communication devices relative to the measurements of features of the second signals of the audio signals received from other of the plurality of communication devices. In certain embodiments, one of the graphical user interface widgets is a timeline widget that scrolls contemporaneously with at least a portion of the multi-party dialog and graphically indicates when each of the users of the communication devices is participating in the dialog. In certain embodiments, the graphical user interface widgets caused to be rendered at one of the plurality of communication devices are rendered in a single graphical user interface. In certain embodiments, the single graphical user interface includes dialog data, the dialog data including one or more of: user identifiers (e.g., telephone numbers, names) associated with the users of the plurality of communication devices. In certain embodiments, the feedback data is used to provide one or more of tonal feedback, vocal feedback, haptic feedback, and color feedback to the plurality of communication devices.

In certain embodiments, performing one or more tests includes one or more of: (i) determining whether the plurality of communication devices include software or logic enabling the communication devices to digitally communicate and transmit audio signals for analysis; and (ii) checking the quality of the digital connections to ensure that they have sufficient bandwidth to transmit and receive the audio signals. In certain embodiments, the plurality of communication devices includes three or more communication devices.

In another aspect, the invention is directed to a method for managing multi-party dialogs, the method comprising: initiating, by a processor of a first communication device, a multi-party dialog (e.g., call) with at least a second communication device and a third communication device, the first second and third communication devices being connected over a plain old telephone service (POTS) connection; establishing a connection, by the processor, with a server over a first digital connection (e.g., VoIP), the server connecting the first communication device, the second communication device, and the third communication device with each other over the first digital connection, a second digital connection and a third digital connection with the second communication device and the third communication device, respectively; receiving, by the processor, a first audio signal from a user (e.g., over a microphone) of the first communication device, the first audio signal including speech spoken by the user of the first communication device during at least a portion of the multi-party dialog; transmitting, by the processor, the first audio signal to the server over the first digital connection; receiving, by the processor, from the server, feedback data, the feedback data including a measurements of features of the first audio signal, measurements of features of a second audio signal corresponding to the second communication device (e.g., measurements of distress, activation, valence, pace/speed, dynamic variation, vocal effort, tone, depressed tone, and/or tension), and measurements of features of a third audio signal corresponding to the third communication device (e.g., measurements of distress, activation, valence, pace/speed, dynamic variation, vocal effort, tone, depressed tone, and/or tension); and outputting, by the processor, the feedback data.

In certain embodiments, outputting the feedback data includes rendering graphical user interface widgets, each of the graphical user interface widgets presenting a portion of the measurements of features of the first audio signal relative to the corresponding measurements of features of the second audio signal and the corresponding measurements of features of the third audio signal. In certain embodiments, the measurements of the features of the first audio signal, the second audio signal and the third audio signal include one or more of: (i) a measure of pace (e.g., "speaking rate") or articulation rate at which users associated with the first, second and third audio signals have spoken over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (ii) a measure of tone (e.g., "dynamic variation") with which the users associated with the first, second and third audio signals have spoken over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (iii) a measure of vocal effort with which the user associated with the first, second and third audio signals have spoken over an interval of time (e.g., a running measure over a previous interval of time, e.g., the previous minute, the previous 2 minutes, the previous 3 minutes, or since the beginning of the communication, etc., and/or a running "instantaneous" measure over a shorter preceding period of time, e.g., wherein the shorter preceding period of time is no greater than 10 seconds, 5 seconds, 3 seconds, 1 second, 0.5 second, 0.3 second, 0.2 second, or 0.1 second); (iv) a measure of amount of time the users associated with the first, second and third audio signals have spoken over an interval of time (e.g., a running measure over the previous minute, or the previous 2 minutes, or the previous 5 minutes, or the previous 10 minutes, or the previous 15 minutes, and/or since the beginning of the communication, etc.); and (v) a measure of perceived depressed tone with which the users associated with the first, second and third audio signals have spoken over an interval of time (e.g., a running measure over the previous minute, or the previous 2 minutes, or the previous 5 minutes, or the previous 10 minutes, or the previous 15 minutes, and/or since the beginning of the communication, etc.).

In certain embodiments, outputting the feedback data is performed in real-time (e.g., at the time that the first audio signal is received, within 1 second, 2 seconds, 5 seconds, 10 seconds). In certain embodiments, the graphical user interface widgets are presented in a single graphical user interface.

In certain embodiments, the method further comprises: determining the quality of the first audio signal; and if it is determined that the quality of the first audio signal is below a predetermined threshold: creating a copy of the first audio signal of a higher quality; and replacing the first audio signal with the copy of the first audio signal.

In certain embodiments, initiating the multi-party dialog includes interfacing with the POTS connection via a public branch exchange (PBX) server.

In certain embodiments, one of the graphical user interface widgets is a timeline widget that scrolls contemporaneously with at least a portion of the multi-party dialog and graphically indicates when each of the users of the first, second and third communication devices is participating in the dialog.

In another aspect, the invention is directed to a system for managing and analyzing multi-party dialogs (e.g., call) between communication devices, comprising: at least one memory; and a processor communicatively coupled to the at least one memory, wherein the processor is operable to: receive digital (e.g., VoIP) connection requests from a plurality of communication devices (e.g., phone, computer, mobile device), the communication devices being connected over a plain old telephone service (POTS) connection; establish a digital connection with each of the plurality of communication devices; perform one or more tests on the plurality of communication devices; switch the connection between the communication devices from the POTS connection to the digital connections, enabling the communication devices to communicate with each other via the computing device (server) over the digital connections; receive audio signals from at least a portion of the plurality of communication devices, the audio signals being part of a multi-party dialog between users of the plurality of communication devices; split the received audio signals into corresponding first signals and second signals; transmit the first signals to the plurality of communication devices of the digital connections in the form of audio to be output by each of the communication devices; analyze the second signals to produce measurements of features of the second signals (e.g., measurements of distress, activation, valence, pace/speed, dynamic variation, vocal effort, tone, depressed tone, and/or tension); and transmit to at least one of the plurality of communication devices, feedback data comprising at least a portion of the measurements of features of the second signals, the feedback data contextualizing each of the participation of the users of the plurality of communication devices during the multi-party dialog.

The description of elements of the embodiments with respect to one aspect of the invention can be applied to another aspect of the invention as well. For example, features described in a claim depending from an independent method claim may be applied, in another embodiment, to an independent system claim.

BRIEF DESCRIPTION OF THE DRAWINGS

The foregoing and other objects, aspects, features, and advantages of the present disclosure will become more apparent and better understood by referring to the following description taken in conjunction with the accompanying drawings, in which:

FIG. 11A illustrates an exemplary model code for Activation model specification.

FIG. 11B illustrates an exemplary model code for Valence model specification.

DETAILED DESCRIPTION

Figure 1:
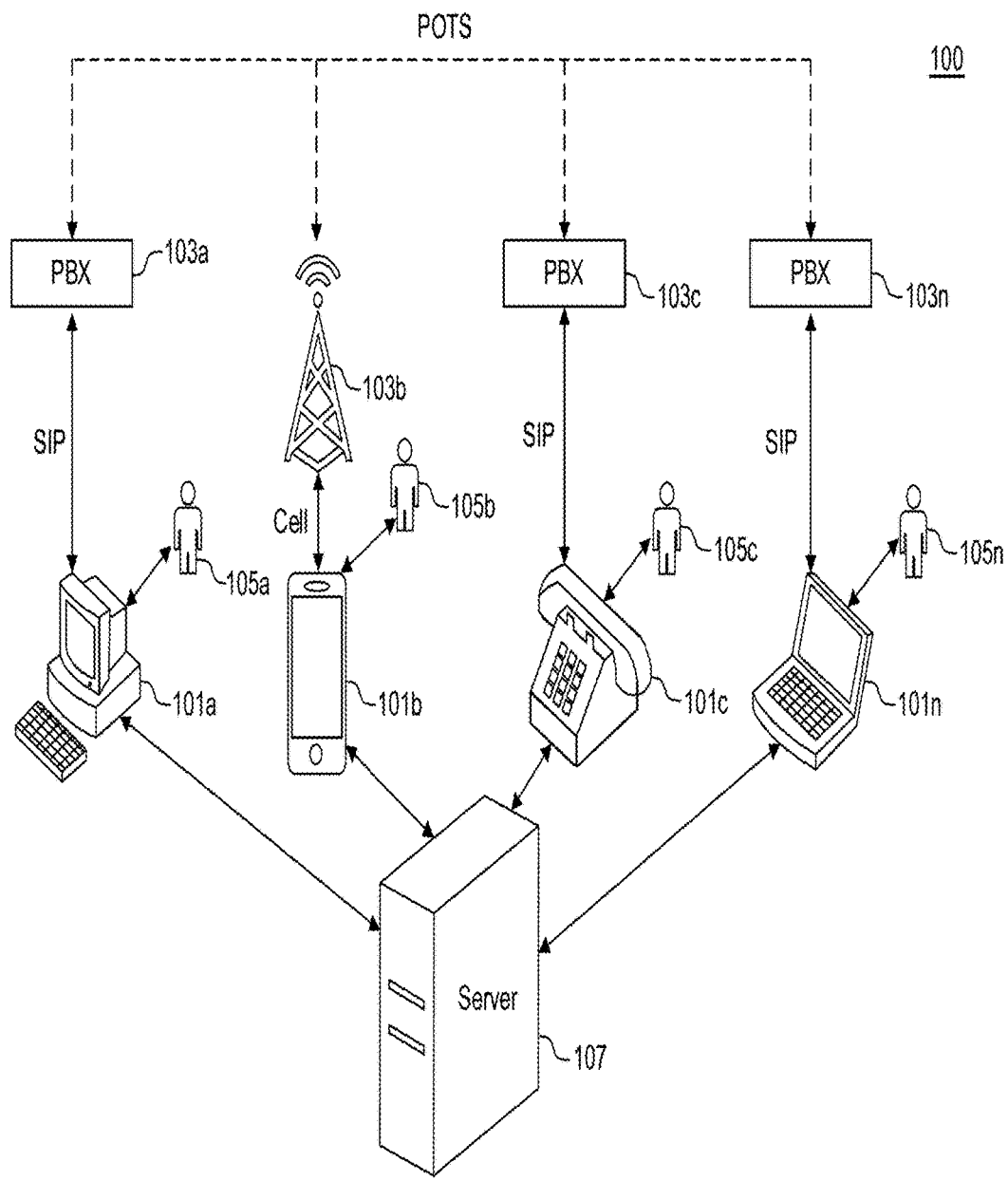
FIG. 1 illustrates a system architecture for managing, analyzing and providing visualizations of multi-party dialogs, according to an exemplary embodiment.

The features and advantages of the present disclosure will become more apparent from the detailed description set forth below when taken in conjunction with the drawings, in which like reference characters identify corresponding elements throughout. In the drawings, like reference numbers generally indicate identical, functionally similar, and/or structurally similar elements.

Throughout the description, where articles, devices, and systems are described as having, including, or comprising specific components, or where processes and methods are described as having, including, or comprising specific steps, it should be understood that, additionally, there are articles, devices, and systems of the present invention that consist essentially of, or consist of, the recited components, and that there are processes and methods according to the present invention that consist essentially of, or consist of, the recited processing steps.

It should be understood that the order of steps or order for performing actions is immaterial so long as the invention remains operable. Moreover, two or more steps or actions may be conducted simultaneously.

The mention herein of any publication or patent application, for example, in the Background section, is not an admission that such publication or patent application constitutes prior art with respect to any of the claims or subject matter presented herein. The Background section is presented for purposes of clarity and is not intended to be a description of prior art with respect to any claim.

System

FIG. 1 illustrates a system architecture 100 for managing, analyzing and providing visualizations of multi-party dialogs, according to an exemplary embodiments. As shown in FIG. 1, system architecture 100 includes users 105a, 105b, 105c, . . . , and 105n (collectively "users," "users 105," or "105"). Each of the users 105 is associated with, operates, and/or manages a corresponding device 101a, 101b, 101c, . . . , and 101n (collectively "devices," "devices 101," or "101"). In some example embodiments, the devices 101 are used to engage in multi-party dialogs such as calls, teleconferences, and the like, and each of the devices includes hardware and/or software necessary to engage in such dialogs. For example, device 101a is a desktop computer, device 101b is a cell phone, device 101c is a traditional land-line or wired telephone, and device 101n is a laptop computer. It should be understood that the devices 101 in FIG. 1 are merely for illustrative purposes, and other devices may be used to engage in multi-party dialogs. Such other devices may be tablets, smartphones, mobile devices, wearable devices, conference stations, automobile navigation systems, smart classrooms, embedded systems, and the like.

The devices 101 are each equipped with at least a processor and memory. In some example implementations, the devices 101 include input and/or output means such as monitors, screens, displays, microphones, speakers, sensors, and the like. The hardware and/or software included in the devices 101 enables them to be used to communicate with other users and/or devices (e.g., in multi-party dialogs). For example, the devices 101 have stored thereon (e.g., in memory) or are associated with software, and application, or the like that, among other things, processes audio and signaling data to manage, analyze, and provide visualizations of multi-party dialogs described herein.

In some example implementations, the devices 101 may have stored thereon and/or execute a softphone or similar phone software. A softphone (or phone software), in some instances, refers to software that provides the interface to a device's corresponding public branch exchange (PBX) system and/or server, and is capable of manipulating outgoing audio. For example, the softphone (or phone software) creates new higher quality copies of the audio and signaling, which in turn are sent to the server 107 for more accurate processing.

In some example implementations, the devices 101 may have stored thereon and/or execute a softphone or similar phone software. A softphone (or phone software), in some instances, refers to software that provides the interface to a device's corresponding PBX, and is capable of manipulating outgoing audio. For example, the softphone (or phone software) creates new higher quality copies of the audio and signaling, which in turn are sent to the server 107 for more accurate processing.

In some example implementations, the devices 101 communicate using voice over internet protocol (VoIP) methods, which transmit voice and signaling information over an IP based network such as the Internet. On the other hand, as shown in FIG. 1, the devices 101 are equipped to engage in bi-directional communications, for example, using plain old telephone service (POTS) functionality. To engage in communications over POTS, the desktop computer 101a, phone 101c and laptop 101n are equipped with corresponding public branch exchanges (PBXs) 103a, 103c, and 103n, respectively. A PBX is a system and/or server that provides an interface between a device and the POTS, enabling communications with other devices over the POTS. In some example implementations, the devices 101 interface with corresponding PBXs using a session initiated protocol (SIP). The SIP is a communications protocol for controlling multimedia (e.g., audio dialog) sessions such as internet telephony, voice and video calls, and the like. In some example implementations, SIP allows VoIP devices to instead communicate using POTS. The cell phone 101b communicates with the other devices 101a, 101c, and 101n by interfacing with the POTS via a cell tower or cell site corresponding to the device's cellular carrier, thereby providing cellular connection.

Also illustrated in FIG. 1 is a server 107. It should be understood that although server 107 is shown as a single server, server 107 may comprise multiple cloud or premise-based servers. The server 107 includes at least a processor and memory. In some example implementations, the server 107 has stored thereon or is associated with an application, software or the like for processing audio and signaling data. For example, the processed audio may be audio received from one or more of the devices 101 during a multi-party dialog. In some example implementations, the server 107 provides management, analysis and/or visualization of multi-party dialogs, as described in further detail with reference to the other figures.

Figure 2:
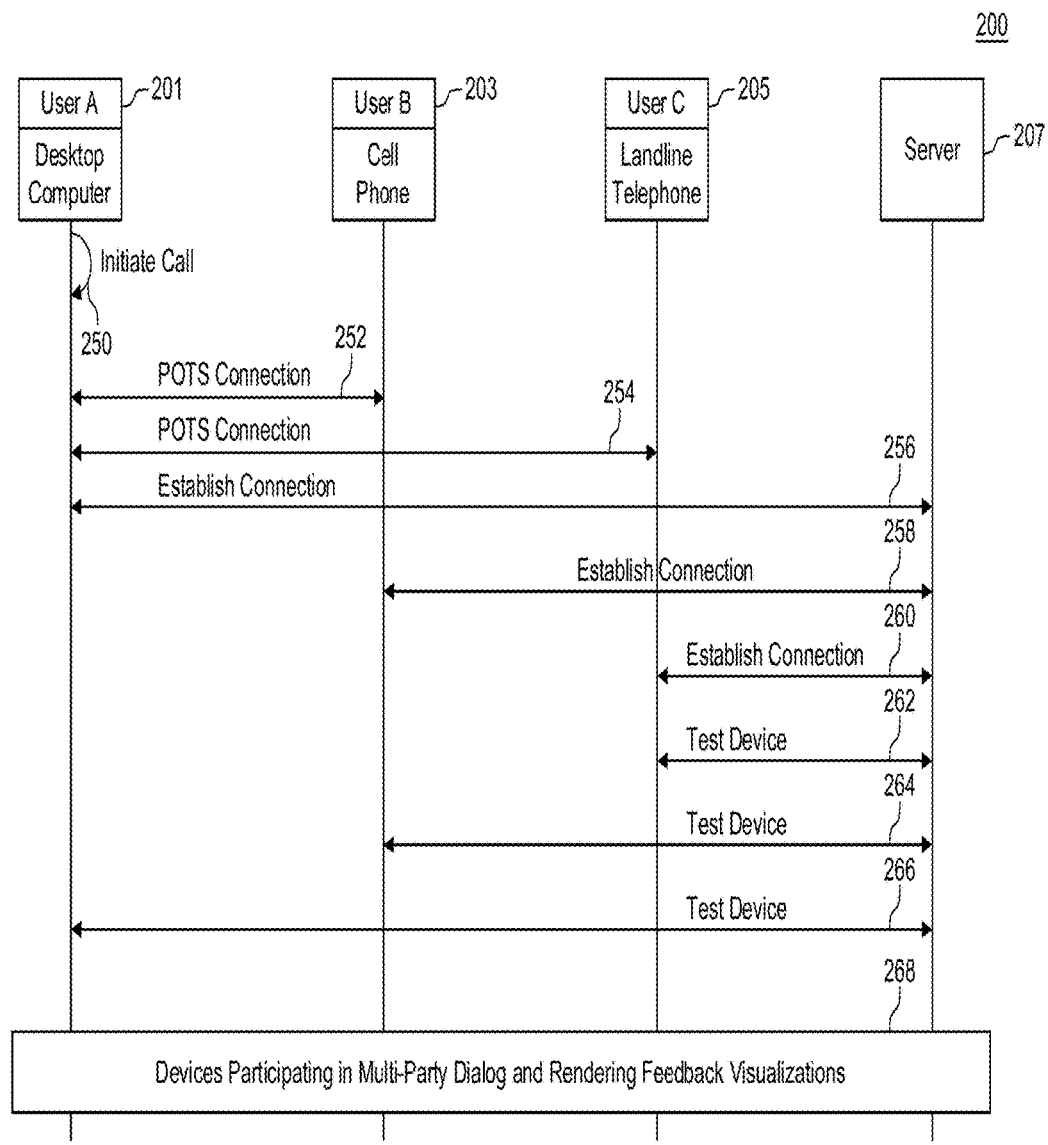
FIG. 2 illustrates a sequence diagram for establishing and managing a multi-party call, in accordance with exemplary embodiments.

FIG. 2 illustrates a sequence diagram 200 for establishing and managing a multi-party call, in accordance with exemplary embodiments. In FIG. 2, user A, user B and user C are associated with and/or operating corresponding communications devices: desktop computer 201 (e.g., FIG. 1, desktop computer 101a), cell phone 203 (e.g., FIG. 1, cell phone 101b), and landline telephone 205 (e.g., FIG. 1, landline telephone 101c), respectively. In some example implementations, the devices 201, 203 and 205 participate in a call or communication.

At step 250, the user A initiates a call, via the desktop computer 201, with user B and user C, at their respective devices cell phone 203 and telephone 205. In some example embodiments, user A may initiate a request for a call but the user B and the user C may dial into the user A. In turn, user's A's desktop computer 201 is connected to user B's cell phone 203 and user C's telephone 205, at steps 252 and 254, respectively. In some example implementations, the connections initiated at steps 252 and 254 are POTS connections. As described above in more detail with reference to FIG. 1, devices 201, 203 and 205 interface with the POTS connection via corresponding PBXs or cellular connections. In some example implementations, devices are interfaced with PBX servers using the session initiation protocol (SIP).

In turn, at steps 256, 258 and 260, connections are established between the devices participating in the call (i.e., desktop computer 201, cell phone 203 and telephone 205) and the server 207 (e.g., FIG. 1, server 107). In preferred embodiments, this is a digital connection, as compared to a copper/paired wire connection. Such a connection may operate with a higher bandwidth, which enables transmission of higher quality audio, transmission of additional types of data (text, alphanumeric, SMS, graphical, and/or video), and/or transmission of audio from many different callers on separate channels, allowing for greater flexibility of data analysis. As described above in further detail with reference to FIG. 1, the server 207 may be cloud or premise based, and includes software and/or logic for processing audio and signaling data received from devices. In some example implementations, the connections established between the devices (201, 203, 205) and the server 207 are VoIP connections. The connections established at step 256, 258 and 260 are used by the respective devices to transmit and receive audio from other devices via the server 207.

At steps 262, 264 and 266, the server 207 performs checks and/or tests on each of the connected devices (201, 203, 205). The tests include, for example, (1) checks to determine if the devices are either softphones or are executing adequate telephone software, and (2) sampling the audio to determine quality of connection. That is, in one type of check, the devices are tested to determine whether they are softphones or are equipped with software and/or logic that allows for multi-party dialog analysis and visualization. Although not illustrated in FIG. 1, if it is determined that a device is not a softphone and/or is not equipped with or able to access telephone software that allows for call audio to be analyzed, communications to and from that device are performed over the POTS connection. For example, if it is determined that the cell phone 203 is not a softphone and does not contain telephone software as described above, then the call between the devices 201, 203 and 205 continues, but audio to and from the cell phone 203 is transmitted via the POTS connection rather than through the connection to the server 207.

In another type of check performed at steps 262, 264 and 266, a series of samples are made between the devices (201, 203, 205) and the server 207. The samples are analyzed by the server 207 to determine whether the connections with the devices is of a sufficient quality (e.g., based on a predetermined standard) to perform analysis of the audio and provide feedback and/or visualizations thereof.

In some example implementations not illustrated in FIG. 2, if it is determined at steps 262, 264 and 266 that any of the internet connections established at steps 256, 258 and 260 are of insufficient quality (e.g., below a predetermined standard), that connection is enhanced using a hybrid mode. For example, if it is determined that the internet connection established at step 256 between the desktop computer 201 and the server 207 is insufficient to provide enough bandwidth, the quality of the audio to and from the desktop computer 201 can be improved by (1) sampling the audio at the desktop computer 201, (2) transmitting the samples over the internet connection to other devices (e.g., cell phone 203 and telephone 205), and (3) reassembling the signals at the other devices (e.g., cell phone 203 and telephone 205). This way, An enhanced audio experience can be provided even in low bandwidth scenarios.

On the other hand, if it is determined that the connections established at step 256, 258 and 260 are of a sufficient quality, the POTS connections established at steps 252 and 254 are transparently (e.g., without the call being affected, without users being made aware) switched to the connections established at steps 256, 258 and 260. That is, the audio that is exchanged between the parties is transmitted over the connections established at steps 256, 258 and 260 rather than over the POTS connections. In this way, audio from the multi-party dialog (e.g., call) is transmitted to and from the devices 201, 203 and 205 via the server 207.

In some example implementations, if it is determined that the connections established at steps 256, 258 and 260 are of a sufficient quality, the POTS connections are still maintained after the communication is switched to the connections established at steps 256, 258 and 260. The POTS connection is maintained, though not active, so that in the event the other connections fail or become degraded (e.g., of insufficient quality), the communication can be transparently switched back to the POTS connection.

In turn, at step (or steps) 268, the devices 201, 203 and 205 participate in a multi-party dialog such as a conference call. The audio to and from each of the devices is routed through the server 207 where analysis, feedback and visualization is provided. Providing analysis, feedback and visualization is described in further detail below with reference to the other figures. In some example implementations, analysis, feedback and visualization are dynamically provided solely to the initiator of the dialog (e.g., call), while in other example implementations, they are provided to multiple participants in a call (e.g., user A, user B, and user C).

Although not illustrated in FIG. 2, during a multi-party dialog (e.g., call), the server 207 performs signal splitting on each of the audio signals received from the devices 201, 203 and 205. That is, as an audio signal is received from one of the devices, the signal is split into two signals. One of the two signals (e.g., post-split) is used for analysis, feedback and visualization (described in further detail below with reference to the other figures), while the other signal is transmitted to the rest of the devices participating in the dialog (e.g., call). In some example implementations, the initial signal can be split into one signal for analysis and into multiple other signals to be sent to corresponding participating devices.

Signal splitting generally refers to the concept of duplicating a single packet of data in a stream or sequence of audio into two or more copies of the packet. Signal splitting is performed by the server 207 without causing any interruption to the dialog. By virtue of signal splitting being performed by the server 207, there is no need to require or perform signal splitting at the devices 201, 203 and 205, or their corresponding PBXs in order to provide feedback, analysis and/or visualizations. In this way, the systems comprising the enterprises to which each of the devices 201, 203 and 205 belong are not burdened with any action during the signal analysis and feedback process. Instead, from the perspective of the devices and their enterprises, the calls are performed and maintained as if no analysis was taking place.

In some example embodiments, the digital connections may have one or more security layers including protected, private and trust no one (TNO). In one exemplary layer of security, digital connections are encrypted via transport layer security (TLS), which is a method of securing web sites and other online connections. In this way, communications over the digital connections are encrypted using strong, industry standard techniques. In another exemplary layer of security (e.g., private), users who wish to privately communicate must terminate (or have terminated) their corresponding POTS connections. The server may not retrain copies of audio transmitted over the private connection. Yet in another exemplary layer of security (e.g., TNO), peer-to-peer connections are made between call participants and keys are exchanged. That is, communications are not performed over either the POTS or digital connections. Instead, encryption is performed directly between the call participants, thereby eliminating any intermediaries (e.g., server).

Figure 3:
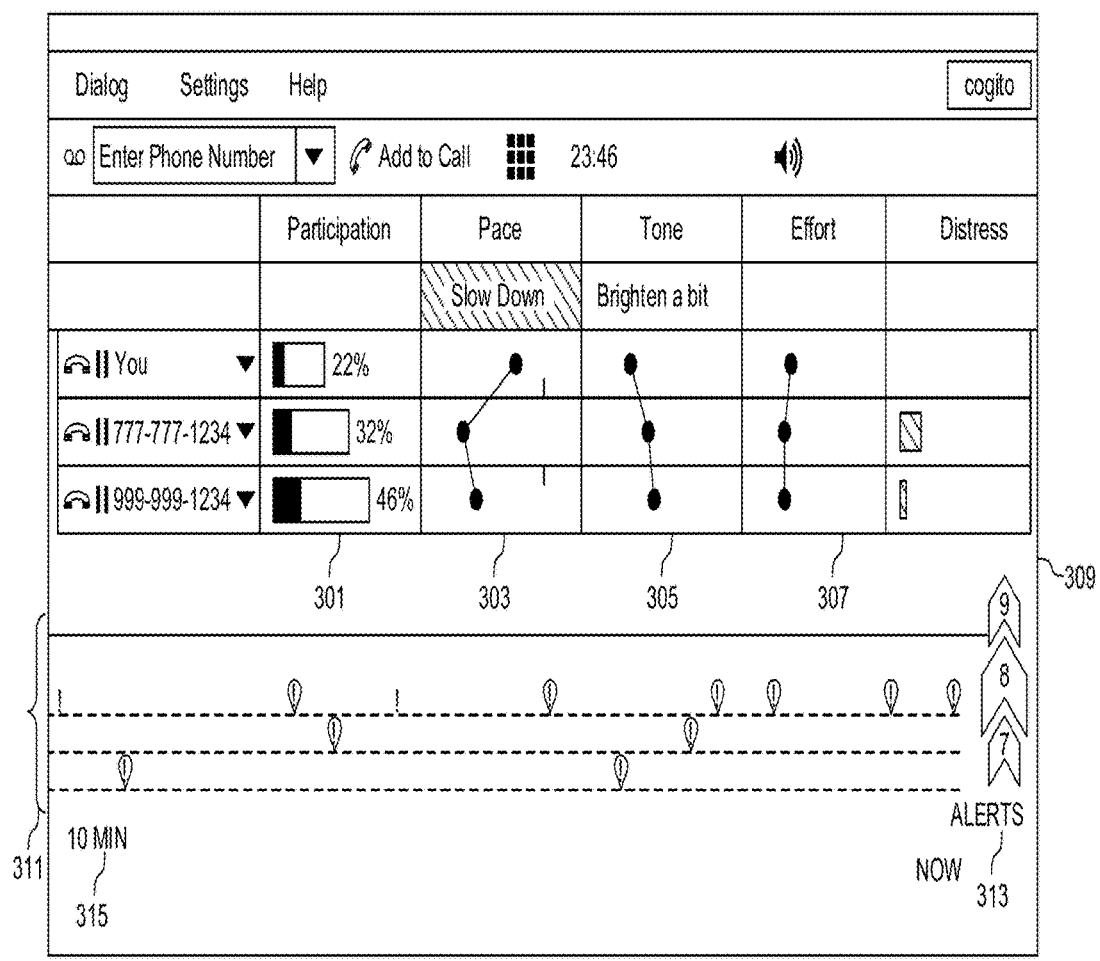
FIG. 3 illustrates a graphical user interface for visualizing feedback, in accordance with an exemplary embodiment.

FIG. 3 illustrates a graphical user interface 300 for visualizing feedback, in accordance with an exemplary embodiment. The graphical user interface 300 may be displayed at and/or by a communication device such as the desktop computer 101a, cell phone 101b, telephone 101c, and laptop 101n, illustrated in FIG. 1. That is, the graphical user interface 300 may be rendered by a communication device to a display, screen, monitor, or the like. In some example embodiments, the graphical user interface 300 is displayed on at least one of multiple communication devices participating in a call, conference or dialog. In other example embodiments, the graphical user interface 300 is displayed on a system or device that is not actively participating in the call, but which is monitoring the communication devices that are active on the call. It should be understood that the information, widgets and graphics illustrated in FIG. 3, may be rendered as part of a single graphical interface (e.g., graphical user interface 300), and may be moved, replaced, deleted, shuffled, altered, or the like. Moreover, as explained above in more detail with reference to FIG. 1, a server may transmit to a communication device all or a part of the information that is rendered in the graphical user interface 300.

Graphical user interface widgets are sets of one or more graphical elements that represent various metrics presented in the real-time display of various embodiments described herein. The graphical elements may include, for example, windows, icons, charts and chart components, scrolling graphical elements, and graphical control elements (e.g., buttons, sliders, list boxes, spinners, drop-down lists, menus, menu bars, toolbars, tabs, scrollbars, frames, dialog boxes, and the like). Widgets may utilize color-coding to differentiate data corresponding to different speakers, for example. Widgets may present data that conveys historical information as well as more immediate information, simultaneously.

In some example embodiments, graphical user interface 300 is used to initiate a call, pick up an incoming call, join a call or the like. The interface 300 may include dialing options (e.g., prompts, commands, buttons) and options to have other participants join a call. The interface 300 may also include call or dialog details such as the length of the call, the participants, and the like.

More specifically, as shown in FIG. 3, the graphical user interface 300 includes graphical user interface widgets 301, 303, 305, 307, 309 and 311, which are used to display and/or render feature measurement information. Obtaining feature measurement information is described above in further detail with reference to FIGS. 1 and 2. Each of the widget displays feature measurement information in association with each party (e.g., user, caller, participant). Moreover, each of the widgets contextualizes the feature measurements, meaning that the measurements of each party are shown relative to the measurements of other parties.

In particular, widget 301 is a participation widget that displays and/or illustrates a measure of participation or the amount of time that each of the parties or users have spoken over an interval of time (e.g., a running measure over the previous minute, or the previous 2 minutes, or the previous 5 minutes, or the previous 10 minutes, or the previous 15 minutes, and/or since the beginning of the dialog or communication.)

Widget 303 is a pace widget that displays and/or illustrates a measure of pace (e.g., speaking rate, articulation rate) at which each of the parties or users participating in a call or dialog have spoken over an interval of time (e.g., a running measure over a previous interval of time (e.g., the previous minute, the previous 2 minutes, the previous 3 minutes, or since the beginning of the communication), and/or a running "instantaneous" measure over a shorter preceding period of time (e.g., wherein the shorter preceding period of time is no greater than 10 seconds, 5 seconds, 3 seconds, 1 second, 0.5 second, 0.3 second, 0.2 second, or 0.1 second)).

Widget 305 is a tone widget that displays and/or illustrates a measure of tone (e.g., dynamic variation) with which parties participating in a call have spoken over an interval of time (e.g., a running measure over a previous interval of time (e.g., the previous minute, the previous 2 minutes, the previous 3 minutes, or since the beginning of the communication) and/or a running "instantaneous" measure over a shorter preceding period of time (e.g., wherein the shorter preceding period of time is no greater than 10 seconds, 5 seconds, 3 seconds, 1 second, 0.5 second, 0.3 second, 0.2 second, or 0.1 second)). The tone widget may indicate whether a tone of voice of a participant is, for example, energetic or monotone. The tone of a participant may be determined based on the dynamic variation metrics and/or dynamic variation models using inputs such as energy, Mel Frequency Cepstral Coefficients (MFCC), pitch and/or vocal effort. Generally, dynamic variation metrics indicate how dynamic (e.g., subdued, flat, lively) participants are during a call. In some example implementations, computations of dynamic variation metrics are performed using empirically trained models generated based on perceptual experiments using human raters to rate conversations.

Widget 307 is an effort widget that displays and/or illustrates a measure of vocal effort with which each of the parties have spoken over an interval of time (e.g., a running measure over a previous interval of time (e.g., the previous minute, the previous 2 minutes, the previous 3 minutes, or since the beginning of the communication) and/or a running "instantaneous" measure over a shorter preceding period of time (e.g., wherein the shorter preceding period of time is no greater than 10 seconds, 5 seconds, 3 seconds, 1 second, 0.5 second, 0.3 second, 0.2 second, or 0.1 second)).

Widget 309 is a distress widget that displays and/or illustrates a measure of distress of each of the parties on a call over an interval of time (e.g., a running measure over a previous interval of time (e.g., the previous minute, the previous 2 minutes, the previous 3 minutes, or since the beginning of the communication) and/or a running "instantaneous" measure over a shorter preceding period of time (e.g., wherein the shorter preceding period of time is no greater than 10 seconds, 5 seconds, 3 seconds, 1 second, 0.5 second, 0.3 second, 0.2 second, or 0.1 second)). In certain embodiments, the measure of distress is computed as a running average pitch variation on one or multiple channels (e.g., both parties in the case of two-party audio), and/or a running average 'sounds depressed' metric. An example distress model is discussed further in the Appendix attached hereto.

In some example embodiments, the graphical user interface 300 includes an overlap widget which can be used to illustrate users overlapping with one another during the dialog or call.

Participation, pace, tone, effort and distress, including the measuring and visualizations thereof, are described in more detail in U.S. patent application Ser. No. 14/440,409 titled "Method and Apparatus for Speech Behavior Visualization and Gamification," and filed May 4, 2015, claiming priority to U.S. patent application Ser. No. 14/205,602 titled "Methods and Apparatus for Speech Behavior Visualization and Gamification," and filed Mar. 12, 2014, the contents of which are incorporated herein by reference.

It should be understood that the widgets may display feature measurement data in a variety of charts, graphs, gauges and the like, including columns, bars, pies, areas, scattered points, lines, doughnuts, bubbles, radars, and the like. Moreover, the widgets may highlight data or information using colors, shading, texturizing, movement, audio, and the like.

In some example embodiments, alerts, suggestions and/or warnings are displayed in connection with a widget. For example, in FIG. 3, a "Slow Down" alert is displayed in or adjacent to the pace widget 303, indicating that the participant viewing the interface 300 should reduce his or her pace during the call. The alert is generated based on the analysis of the feature measurements of pace of each of the participants. The alert may be highlighted with a color, by blinking, or in any other way that can draw attention from the user. In another example in FIG. 3, a "Brighten a bit" alert, note or suggestion is displayed in or adjacent to the tone widget 305, indicating that the participant viewing the interface 300 would benefit from "brightening" or sounding more joyful, cheerful, or the like, based on his or her tone.

The information for which alerts (e.g., warnings, suggestions) are displayed can be customized, for example, by selecting the button 313 ("Alerts"). Selection of the button 313 causes a window, panel, widget or the like to be displayed showing options of the types of alerts that can be calculated and/or illustrated on the graphical user 300. In one example embodiment, the types of alerts that can be shown (or the measurements with which alerts to be displayed are associated) include participation, pace, tone, effort, overlap and distress. Examples of alerts, warning, suggestions or the like include: "maybe slow down" (with relation to pace), "listen more" (with relation to participation), and possibly upset (with relation to distress).

It should also be understood that the measurements of features corresponding to each participant can be displayed in another manner that shows their correspondence. While in FIG. 3 participants (e.g., participant identifiers) are shown on the same horizontal line as their feature measurements, the feature measurements may instead be plotted on a vertical line from the participants, or the like.

The graphical user interface 300 also includes a timeline widget 311 which is used to display a timeline showing which participant is speaking during the call. In some example embodiments, the timeline widget 311 illustrates speaking by a party using a line. However, it should be understood that representation of speaking on the timeline may be accomplished in a variety of ways including dot lines, colors, bars, and the like. In some example implementations, plotted on the timeline widget are alerts (e.g., warnings, notes, suggestions). Alerts are plotted on the timeline in connection with an instance of speaking by a party. The alerts may be color coded (e.g., red for warning, green for positive note, yellow for neutral suggestions) or may have an indicator (e.g., exclamation point for warnings, check marks for notes or suggestions).

Figure 4:
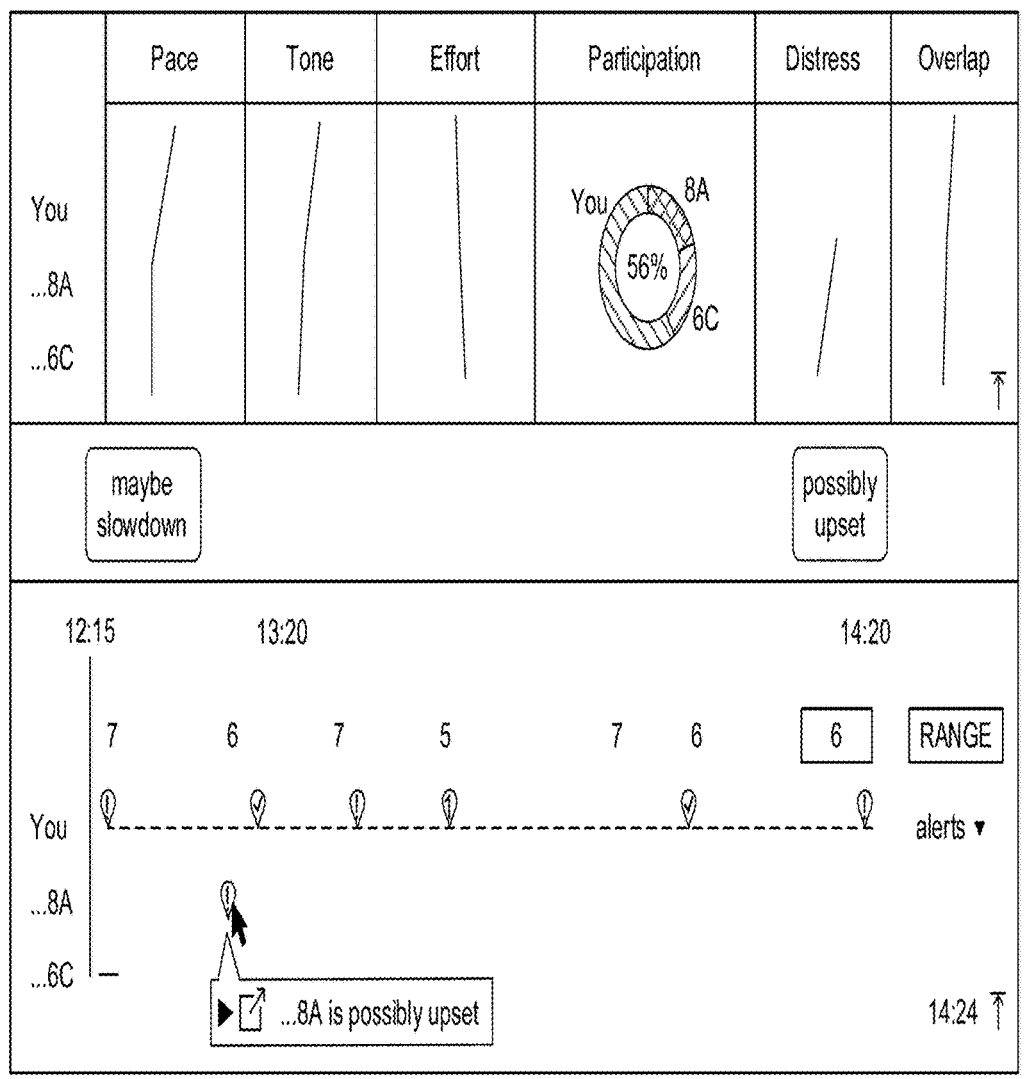
FIG. 4 illustrates a graphical user interface for visualizing feedback, in accordance with an exemplary embodiment.

In some example embodiments, clicking the alerts causes a "bubble" or the like to be rendered, as shown in FIG. 4. In FIG. 4, the timeline widget includes a warning for speaker 8A, at minute 6 of the call. Clicking, tapping or selecting that warning causes a bubble to be shown, including options to: play a clip of audio showing the reason for the alert, an option to remove the alert, and a textual message accompanying or corresponding to the alert "8A is possibly upset."

Still with reference to FIG. 3, the timeline widget and other widgets (e.g., 301, 303, 305, 307, 309) can be restricted to display, render and/or represent data within a certain period of time. In FIG. 3, the interface 300 includes a button 315 ("10 Min") which, if selected, loads or renders a list of options for narrowing the amount of time for which to plot measurements of the features. In one example embodiment, the options include 10 minutes, 5 minutes, 1 minute, all, and range. Selecting the "all" option causes the measurements derived from the entire call to be plotted on the interface 300. Selecting the "range" feature causes the measurements derived from a selected range of time to be plotted on the interface 300. The desired range of time can be input by selecting (e.g., with a square selection tool) a period of time on the timeline or by entering the minutes of interest. Selecting the other options cause measurements during the time specified by the option to be plotted on the interface 300.

Figure 5:
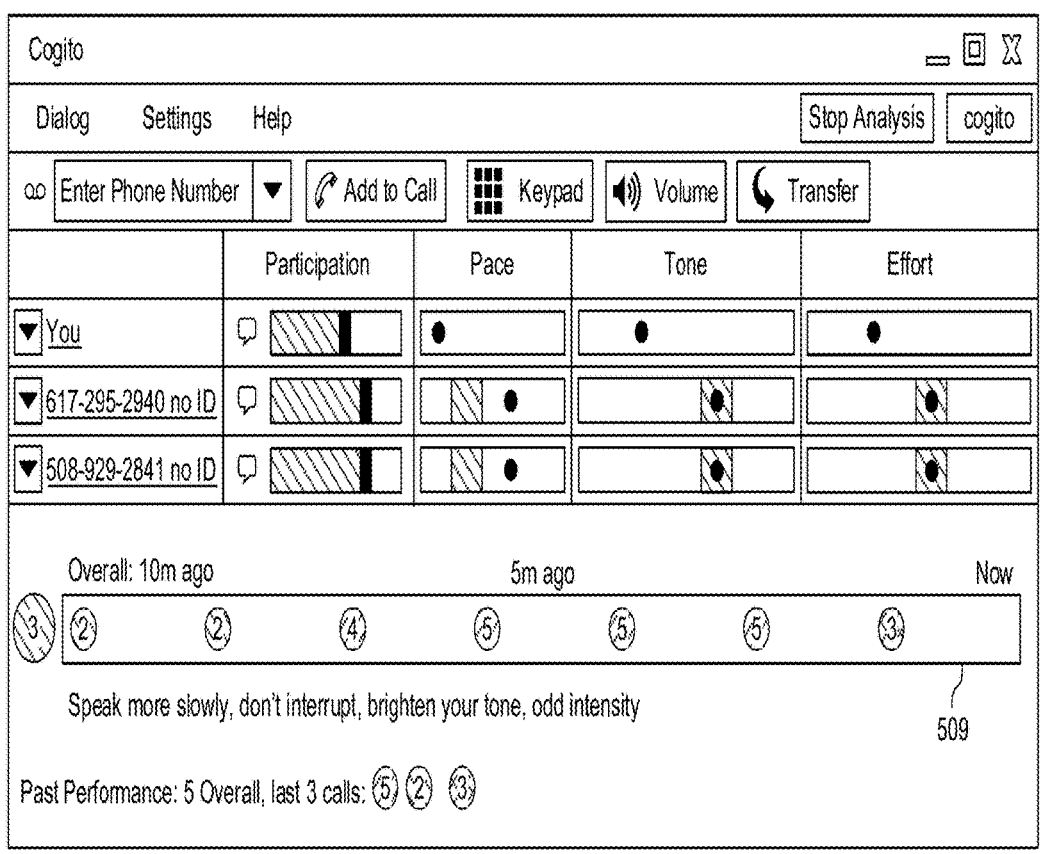
FIG. 5 illustrates a graphical user interface for visualizing feedback, in accordance with an exemplary embodiment.

FIG. 5 illustrates a graphical user interface 500 for visualizing feedback, in accordance with an exemplary embodiment. The graphical user interface 500 includes participation, pace, tone and effort widgets, similar to those described above with reference to FIG. 3. As shown in FIG. 5, information, widgets and graphics may be altered and redistributed on an interface while still displaying, among other things, representations of the measurements of the features.

In one exemplary embodiment, as shown in FIG. 5, scores may be assigned to portions of a call and to an entire call. For example FIG. 5 illustrates a score bar 509, which shows scores of the call in a chronological timeline (e.g., 10 minutes ago, now). A score may be represented as an icon (e.g., circle) with a score value number and/or a color. The score values, in one example, are between one and ten, with one representing the lowest or worst score, and ten representing the highest or best score. In some example embodiments, lower scores are highlighted with darker or red colors.

Interface 500 also includes a summary of other call scores, such as a past performance score (e.g., "Past Performance: 5"), indicating a prior score or average score, as well as a score for a number of previous calls (e.g., "Overall, last calls: 5, 2, 3").

Figure 6:
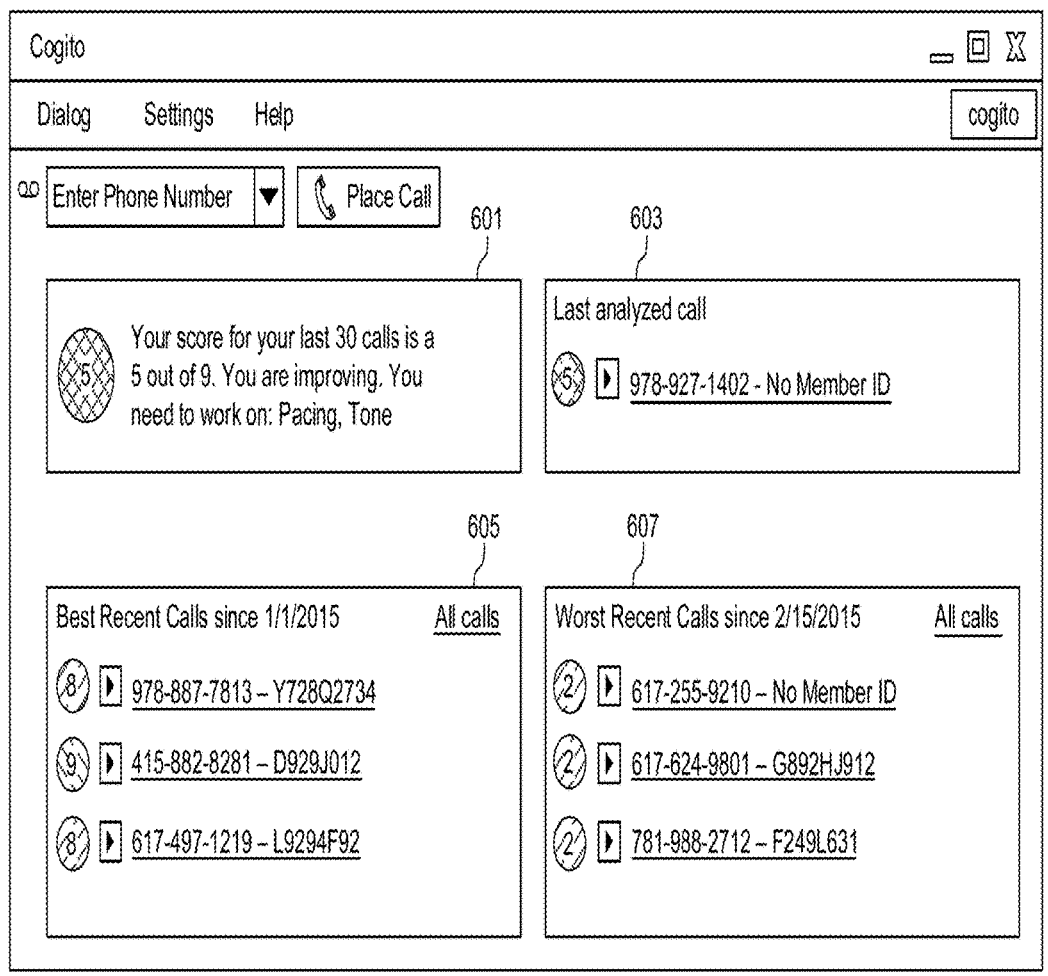
FIG. 6 illustrates a graphical user interface for visualizing feedback, in accordance with an exemplary embodiment.

FIG. 6 illustrates a graphical user interface 600 for visualizing feedback, in accordance with an exemplary embodiment. The graphical user interface 600 includes a summary of audio analysis information gathered or produced during prior calls. For example, the interface 600 includes an overall score widget 601 for the user viewing the interface 600. The overall score indicates the score of all (or a set) of the calls in which the user has participated.

The interface 600 also includes a last analyzed score widget 603, indicating the number and score of the last call that was analyzed in which the user participated. A best recent calls widget 605 includes a number (e.g., 3) of recent calls with best scores that were achieved by the user during the call. Similarly, a worst recent calls widget 607 includes a number (e.g., 3) of recent calls with worst scores that were achieved by the user during the call.

In some example implementations, audio analysis history information may be stored and/or accessed. The analysis history information provides a list, chart, graph, plot or the like of all or a portion of the calls made by each user, along with information for each call such as: score, average score of all participants, call participant names and telephone numbers, starting date and time of call, duration of call, device identifier of the user, gender, age, and the like. In some example implementations, each call may be recorded for future analysis or playback.

Figure 7:
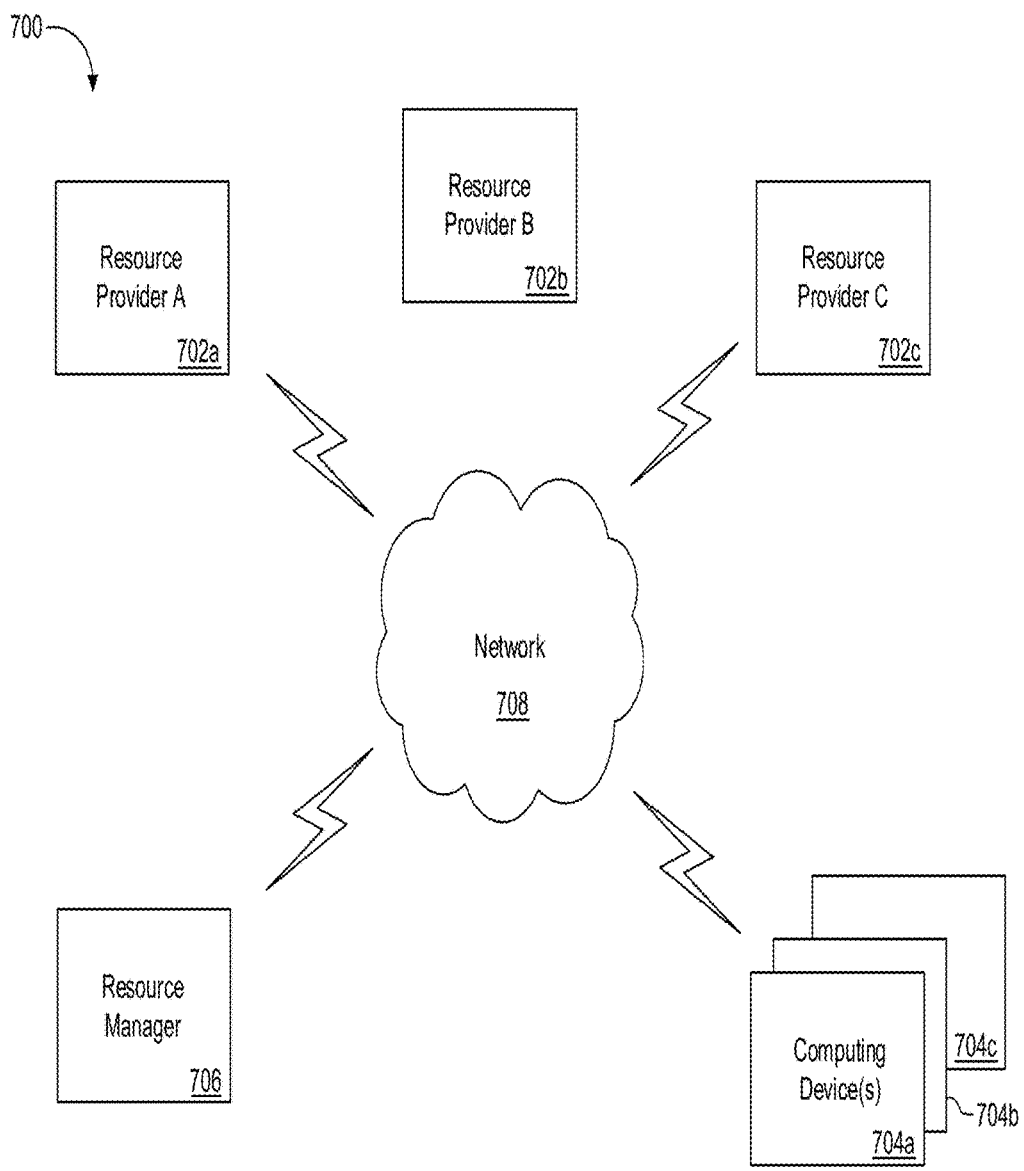
FIG. 7 is a block diagram of an example network environment for use in the methods and systems for analysis of spectrometry data, according to an illustrative embodiment.

FIG. 7 shows an illustrative network environment 700 for use in the methods and systems for analysis of spectrometry data corresponding to particles of a sample, as described herein. In brief overview, referring now to FIG. 7, a block diagram of an exemplary cloud computing environment 700 is shown and described. The cloud computing environment 700 may include one or more resource providers 702a, 702b, 702c (collectively, 702). Each resource provider 702 may include computing resources. In some implementations, computing resources may include any hardware and/or software used to process data. For example, computing resources may include hardware and/or software capable of executing algorithms, computer programs, and/or computer applications. In some implementations, exemplary computing resources may include application servers and/or databases with storage and retrieval capabilities. Each resource provider 702 may be connected to any other resource provider 702 in the cloud computing environment 700. In some implementations, the resource providers 702 may be connected over a computer network 708. Each resource provider 702 may be connected to one or more computing device 704a, 704b, 704c (collectively, 704), over the computer network 708.

The cloud computing environment 700 may include a resource manager 706. The resource manager 706 may be connected to the resource providers 702 and the computing devices 704 over the computer network 708. In some implementations, the resource manager 706 may facilitate the provision of computing resources by one or more resource providers 702 to one or more computing devices 704. The resource manager 706 may receive a request for a computing resource from a particular computing device 704. The resource manager 706 may identify one or more resource providers 702 capable of providing the computing resource requested by the computing device 704. The resource manager 706 may select a resource provider 702 to provide the computing resource. The resource manager 706 may facilitate a connection between the resource provider 702 and a particular computing device 704. In some implementations, the resource manager 706 may establish a connection between a particular resource provider 702 and a particular computing device 704. In some implementations, the resource manager 706 may redirect a particular computing device 704 to a particular resource provider 702 with the requested computing resource.

Figure 8:
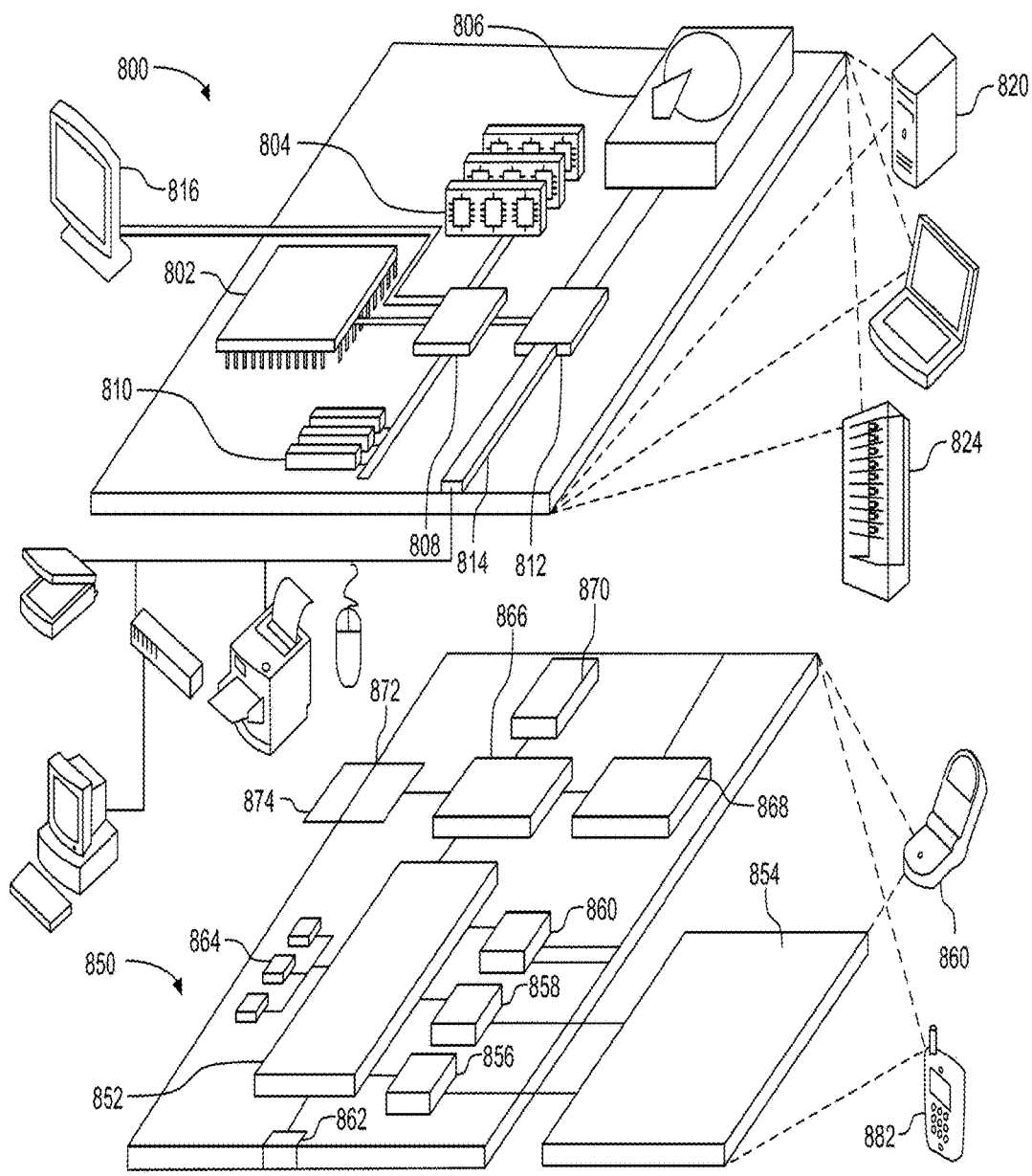
FIG. 8 is a block diagram of an example computing device and an example mobile computing device, for use in illustrative embodiments of the invention.

FIG. 8 shows an example of a computing device 800 and a mobile computing device 850 that can be used in the methods and systems described in this disclosure. The computing device 800 is intended to represent various forms of digital computers, such as laptops, desktops, workstations, personal digital assistants, servers, blade servers, mainframes, and other appropriate computers. The mobile computing device 850 is intended to represent various forms of mobile devices, such as personal digital assistants, cellular telephones, smart-phones, and other similar computing devices. The components shown here, their connections and relationships, and their functions, are meant to be examples only, and are not meant to be limiting.

The computing device 800 includes a processor 802, a memory 804, a storage device 806, a high-speed interface 808 connecting to the memory 804 and multiple high-speed expansion ports 810, and a low-speed interface 812 connecting to a low-speed expansion port 814 and the storage device 806. Each of the processor 802, the memory 804, the storage device 806, the high-speed interface 808, the high-speed expansion ports 810, and the low-speed interface 812, are interconnected using various busses, and may be mounted on a common motherboard or in other manners as appropriate. The processor 802 can process instructions for execution within the computing device 800, including instructions stored in the memory 804 or on the storage device 806 to display graphical information for a GUI on an external input/output device, such as a display 816 coupled to the high-speed interface 808. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 804 stores information within the computing device 800. In some implementations, the memory 804 is a volatile memory unit or units. In some implementations, the memory 804 is a non-volatile memory unit or units. The memory 804 may also be another form of computer-readable medium, such as a magnetic or optical disk.

The storage device 806 is capable of providing mass storage for the computing device 800. In some implementations, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 802), perform one or more methods, such as those described above. The instructions can also be stored by one or more storage devices such as computer- or machine-readable mediums (for example, the memory 804, the storage device 806, or memory on the processor 802).

The high-speed interface 808 manages bandwidth-intensive operations for the computing device 800, while the low-speed interface 812 manages lower bandwidth-intensive operations. Such allocation of functions is an example only. In some implementations, the high-speed interface 808 is coupled to the memory 804, the display 816 (e.g., through a graphics processor or accelerator), and to the high-speed expansion ports 810, which may accept various expansion cards (not shown). In the implementation, the low-speed interface 812 is coupled to the storage device 806 and the low-speed expansion port 814. The low-speed expansion port 814, which may include various communication ports (e.g., USB, Bluetooth®, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. In addition, it may be implemented in a personal computer such as a laptop computer 822. It may also be implemented as part of a rack server system 824. Alternatively, components from the computing device 800 may be combined with other components in a mobile device (not shown), such as a mobile computing device 850. Each of such devices may contain one or more of the computing device 800 and the mobile computing device 850, and an entire system may be made up of multiple computing devices communicating with each other.

The mobile computing device 850 includes a processor 852, a memory 864, an input/output device such as a display 854, a communication interface 866, and a transceiver 868, among other components. The mobile computing device 850 may also be provided with a storage device, such as a micro-drive or other device, to provide additional storage. Each of the processor 852, the memory 864, the display 854, the communication interface 866, and the transceiver 868, are interconnected using various buses, and several of the components may be mounted on a common motherboard or in other manners as appropriate.

The processor 852 can execute instructions within the mobile computing device 850, including instructions stored in the memory 864. The processor 852 may be implemented as a chipset of chips that include separate and multiple analog and digital processors. The processor 852 may provide, for example, for coordination of the other components of the mobile computing device 850, such as control of user interfaces, applications run by the mobile computing device 850, and wireless communication by the mobile computing device 850.

The processor 852 may communicate with a user through a control interface 858 and a display interface 856 coupled to the display 854. The display 854 may be, for example, a TFT (Thin-Film-Transistor Liquid Crystal Display) display or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may provide communication with the processor 852, so as to enable near area communication of the mobile computing device 850 with other devices. The external interface 862 may provide, for example, for wired communication in some implementations, or for wireless communication in other implementations, and multiple interfaces may also be used.

The memory 864 stores information within the mobile computing device 850. The memory 864 can be implemented as one or more of a computer-readable medium or media, a volatile memory unit or units, or a non-volatile memory unit or units. An expansion memory 874 may also be provided and connected to the mobile computing device 850 through an expansion interface 872, which may include, for example, a SIMM (Single In Line Memory Module) card interface. The expansion memory 874 may provide extra storage space for the mobile computing device 850, or may also store applications or other information for the mobile computing device 850. Specifically, the expansion memory 874 may include instructions to carry out or supplement the processes described above, and may include secure information also. Thus, for example, the expansion memory 874 may be provided as a security module for the mobile computing device 850, and may be programmed with instructions that permit secure use of the mobile computing device 850. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier and, when executed by one or more processing devices (for example, processor 852), perform one or more methods, such as those described above. The instructions can also be stored by one or more storage devices, such as one or more computer- or machine-readable mediums (for example, the memory 864, the expansion memory 874, or memory on the processor 852). In some implementations, the instructions can be received in a propagated signal, for example, over the transceiver 868 or the external interface 862.

The mobile computing device 850 may communicate wirelessly through the communication interface 866, which may include digital signal processing circuitry where necessary. The communication interface 866 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 868 using a radio-frequency. In addition, short-range communication may occur, such as using a Bluetooth®, Wi-Fi™, or other such transceiver (not shown). In addition, a GPS (Global Positioning System) receiver module 870 may provide additional navigation- and location-related wireless data to the mobile computing device 850, which may be used as appropriate by applications running on the mobile computing device 850.

The mobile computing device 850 may also communicate audibly using an audio codec 860, which may receive spoken information from a user and convert it to usable digital information. The audio codec 860 may likewise generate audible sound for a user, such as through a speaker, e.g., in a handset of the mobile computing device 850. Such sound may include sound from voice telephone calls, may include recorded sound (e.g., voice messages, music files, etc.) and may also include sound generated by applications operating on the mobile computing device 850.

The mobile computing device 850 may be implemented in a number of different forms, as shown in the figure. For example, it may be implemented as a cellular telephone 880. It may also be implemented as part of a smart-phone 882, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

EXAMPLE A

Computation of a Measure of Distress

Introduction

Figure 9:
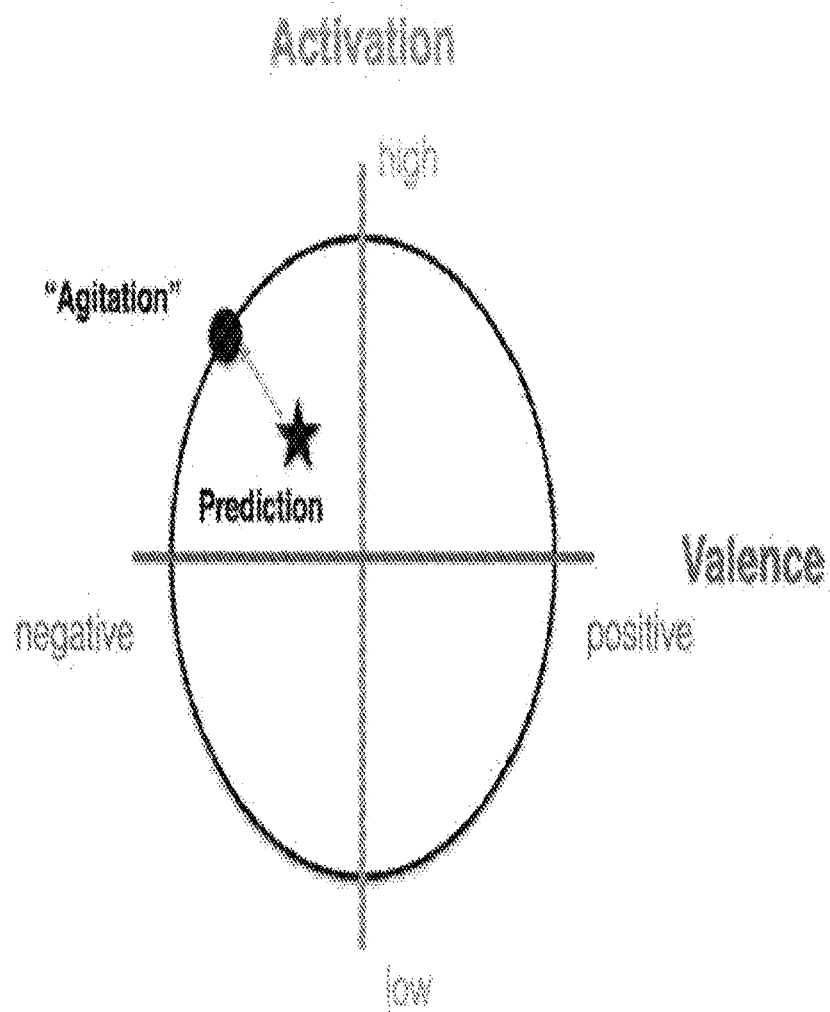
FIG. 9 is an exemplary Activation-Valence Diagram.

The goal of this work is to develop and evaluate a proof-of-concept attempt at being able to classify the emotional of affective quality of a segment of speech along two dimensions: Activation (sometimes called arousal) and Valence. The motivation for this work is to be able to classify emotional and affective states from speech in a somewhat quantitative and reusable way. Very often there are requests to be able to classify some subjective affective state, e.g., "Agitation or Distress." To do this, one could develop specific individual models, but besides not being very scalable, it can be difficult to get reliable annotations of this perceptual target. By being able to classify speech along the 2 dimensions of Activation and Valence, it is possible to then classify states like "Agitation" by assigning coordinates of this target on the 2D plane (see FIG. 9). The distance from these coordinates to the coordinates of the model prediction can be used to determine the prediction of that affective state.

Experimental Design

Data: For this initial proof of concept study it was decided to use a publicly available speech database to train and evaluate the models. Subsequent studies may require own data collection, e.g., using client data or Mechanical Turk. The following data sets were used: "Berlin Emotion Database" (535 short audio clips with speech acted in several emotions—anger, boredom, disgust, anxiety/fear, happiness/sadness), and "SSPnet personality corpus" (640 speech clips (10 seconds each) for a total of 332 subjects. Each clip was assessed by 11 raters in terms of the Big Five Personality traits. (the assessments were performed using the BFI-10 questionnaire), namely Extraversion, Agreeableness, Conscientiousness, Neuroticism, Openness)

Modeling

Binary Classification: Here, class labels converted into binary labels. (a) Train a logistic regression model using elastic net procedure. (b) Train a logistic regression model using manual variable selection (following correlation analysis). (c) Train an Artificial Neural Network (ANN) model with and without variable selection.

Training and Validation

Training and validation performed as follows: 90% training with K-fold cross validation, and additional validation on 10% test set. Cross corpus training tests: models were trained on one dataset, and the test on the separate dataset.

Signal Visualization

Figure 10A:
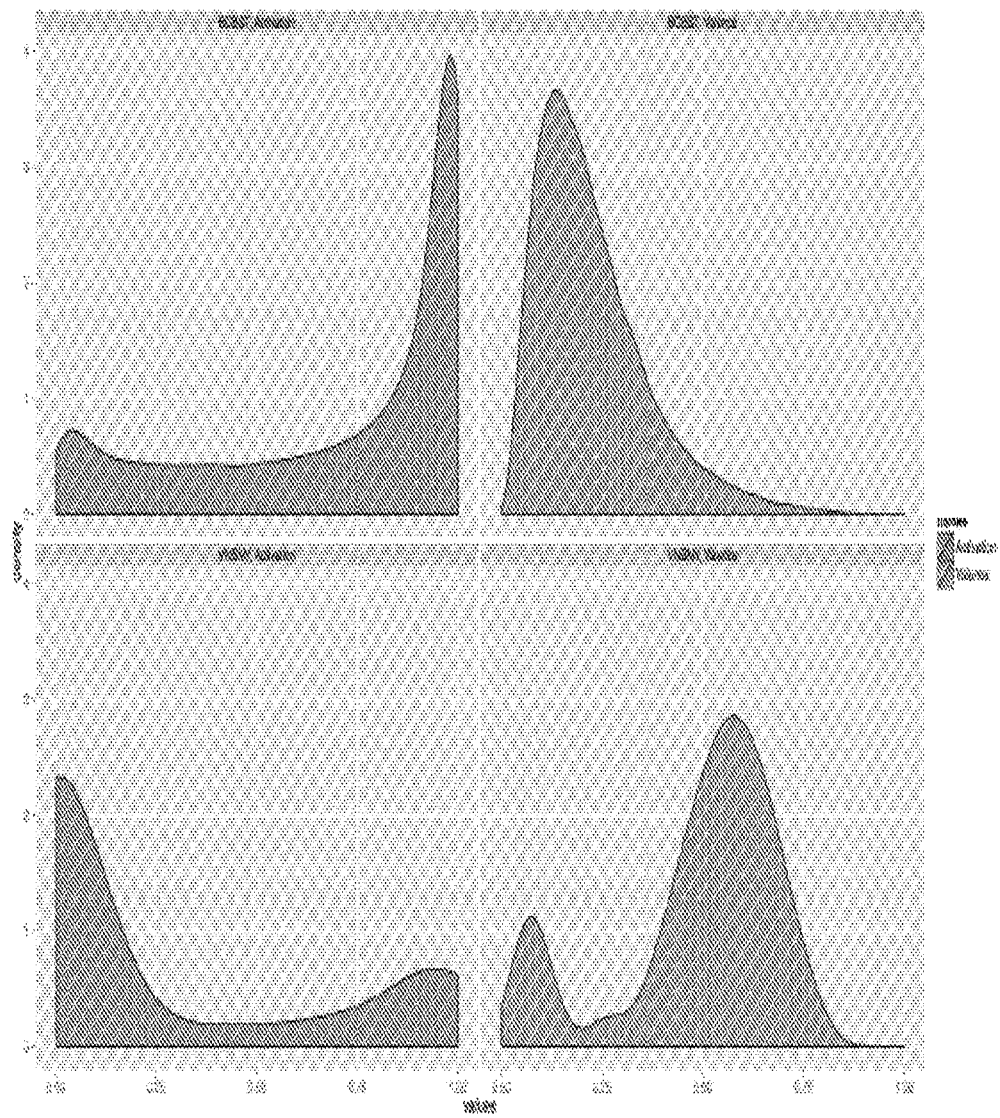
FIG. 10A is a diagram of an exemplary Empirical Distributions of Activation and Valence at slice level.
Figure 10B:
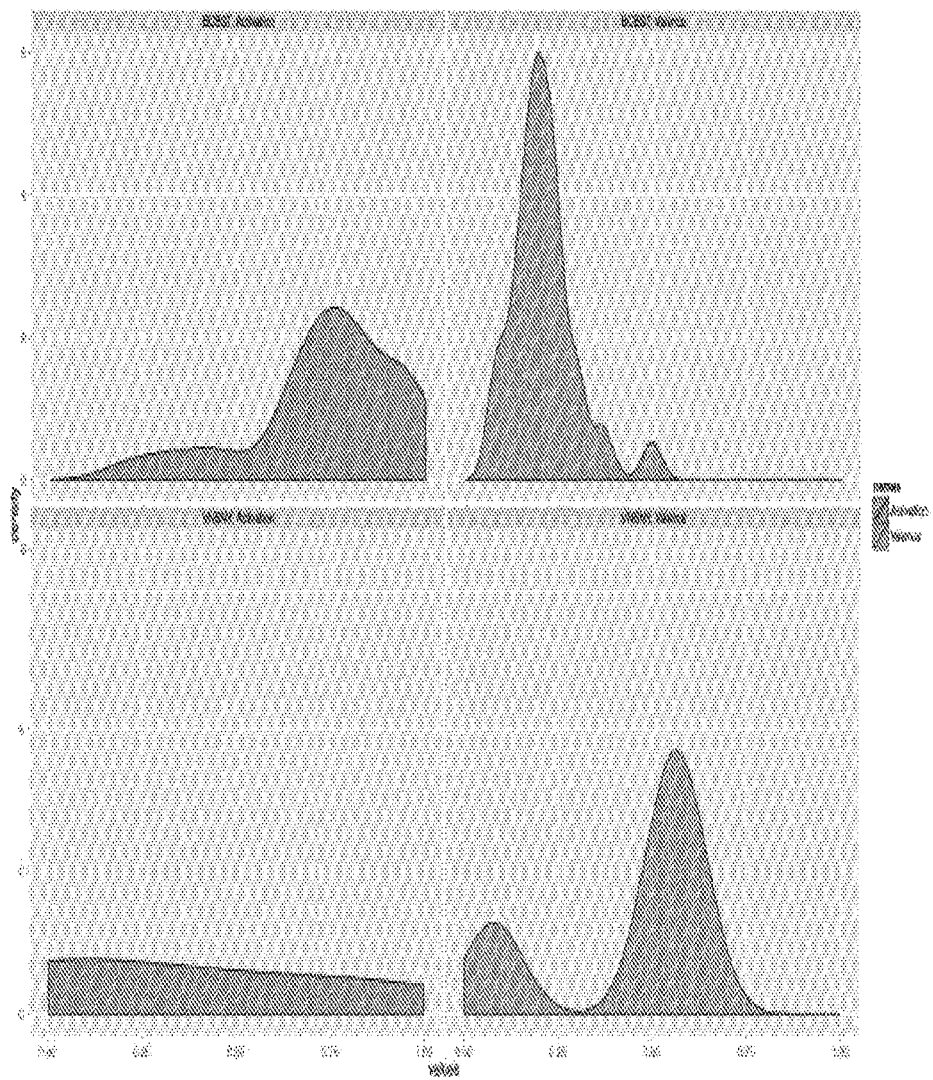
FIG. 10B is a diagram of an exemplary Empirical Distributions of Activation and Valence at call level.

Based on the Empirical Distributions (FIGS. 10A and 10B), the following are recommendations for visualizing in product Activation (Upper Limit): 1
Activation (Lower Limit): 0
Valence (Upper Limit): 0.75
Valence (Lower Limit): 0

Exemplary code for the selected models for Activation and Valence is shown in FIGS. 11A and 11B. "Activation" could also be called "Intensity." It is a signal that should give low values if a speaking style is passive (e.g., depressed, quietly content) and high values if a speaking style is active and intense (e.g., hot anger, wildly excited). "Valence" could also be called "Attitude." It is a signal that should give low values if a speaking style is negative sounding (e.g., depressed, hot anger) and high values if a speaking style is positive sounding (e.g., wildly excited, quietly content).

EXAMPLE B

Example Graphical Widgets (Timeline View and Alert View) for Display in a Method for Managing and Analyzing Multi-Party Dialogs In some embodiments, the multi-party conversation visualization interface involves one, two, or three levels of expansion. For example, in one such embodiment, a Responsive Design paradigm can be employed whereby the user can drag the window to switch between the three levels. All three levels can include soft phone functionality.

The most compact view can, in addition to the phone functionality, display a "chat-like" feed of alerts or notifications which highlight striking speaking characteristics on the part of the user, their interlocutors or the user compared to any of their interlocutors. Text notifications may be supported with graphical icon images which reinforce the message. Such text notifications may be either descriptive (e.g., "you are speaking fast") or prescriptive (e.g., "slow-down"). Exploiting the Responsive Design paradigm, the user can stretch the window vertically to view more historical notifications from the call. Such a visualization mode has the advantage of taking up a very small portion of the user's desktop while at the same time converting complex real-time signal data down into quick to perceive messages.

Figure 12:
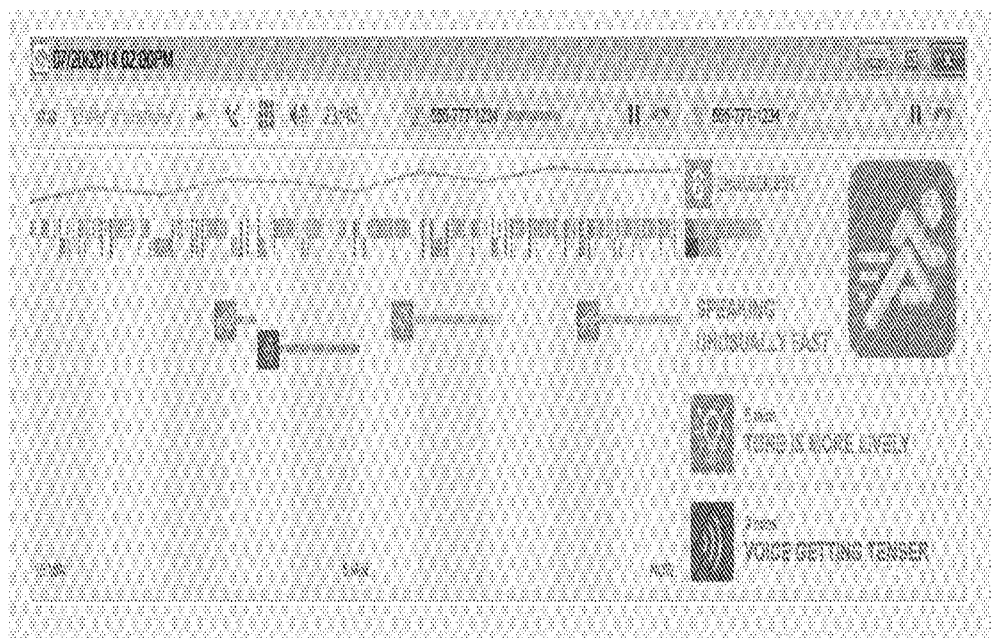
FIG. 12 illustrates a graphical user interface of a Timeline View, in accordance with an exemplary embodiment.
Figure 13:
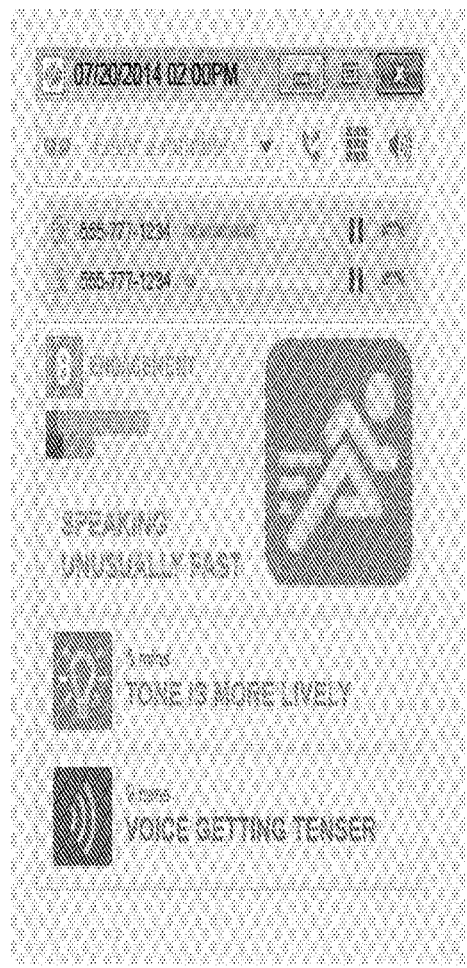
FIG. 13 illustrates a graphical user interface of an Alert View, in accordance with an exemplary embodiment.

Stretching the window horizontally may allow the user to switch to a Timeline view (FIG. 12). Here, notifications are positioned temporally on the Timeline and can be access by hovering a cursor over them or playing through them, e.g., when reviewing previous calls. Additionally, the Timeline view may display trend lines of signals characterizing speaking style over the duration of the call. The Alert View is shown in FIG. 13.

Figure 14:
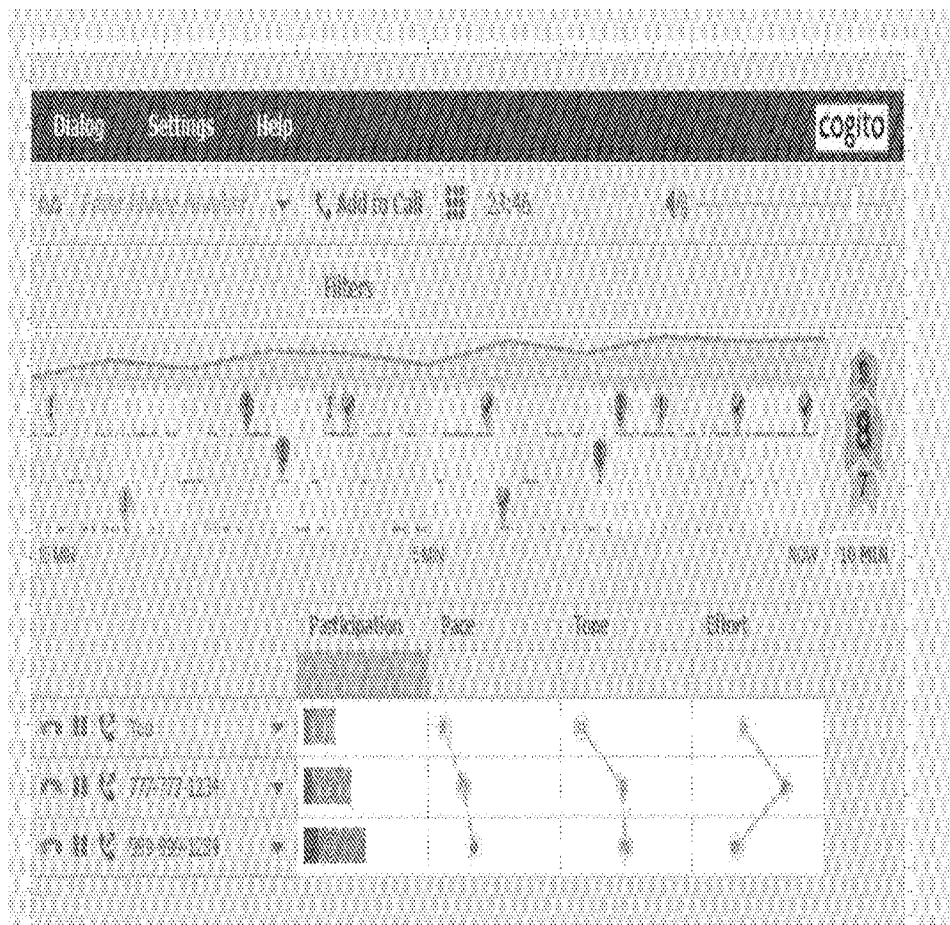
FIG. 14 illustrates a graphical user interface of an Extended Timeline View, in accordance with an exemplary embodiment.

By stretching the Timeline mode window vertically, the user can move to a more expanded view (FIG. 14). In certain embodiments, this view provides additional fine-grained signal information with visualization widgets which indicate the user's speaking characteristics compared to their interlocutor(s) in real-time.

What is claimed is:

1. A method for managing multi-party dialogs between communication devices, the method comprising:
   receiving, by a processor of a computing device, digital connection requests from a plurality of communication devices, the communication devices being connected over a plain old telephone service (POTS) connection;
   establishing, by the processor, a digital connection with each of the plurality of communication devices;
   performing, by the processor, one or more tests on the plurality of communication devices;
   switching, by the processor, the connection between the communication devices from the POTS connection to the digital connections, enabling the communication devices to communicate with each other via the computing device (server) over the digital connections;
   receiving, by the processor, audio signals from at least a portion of the plurality of communication devices, the audio signals being part of a multi-party dialog between users of the plurality of communication devices;
   splitting, by the processor, the received audio signals into corresponding first signals and second signals;
   transmitting, by the processor, the first signals to the plurality of communication devices of the digital connections in the form of audio to be output by each of the communication devices; and
   transmitting, by the processor, to at least one of the plurality of communication devices, feedback data comprising at least a portion of measurements of features of the second signals, the feedback data contextualizing each of the participation of the users of the plurality of communication devices during the multi-party dialog.

2. The method of claim 1, wherein the audio signals include speech spoken by the users of the plurality of communication devices and are received in real-time as they are spoken by the users during the multi- party dialog.

3. The method of claim 1, wherein the steps of receiving the audio signals, splitting the audio signals, transmitting the first signals to the plurality of communication devices, and transmitting the feedback data are performed in real-time.

4. The method of claim 1, wherein the measurements of features of each of the second signals include one or more of:
   (i) a measure of pace or articulation rate at which the user associated with the second signal has spoken over an interval of time;
   (ii) a measure of tone with which the user associated with the second signal has spoken over an interval of time;
   (iii) a measure of vocal effort with which the user associated with the second signal has spoken over an interval of time;
   (iv) a measure of amount of time the user associated with the second signal has spoken over an interval of time; and
   (v) a measure of perceived depressed tone with which the user associated with the second signal has spoken over an interval of time.

5. The method of claim 4, wherein the transmitting the feedback data comprising the at least a portion of the measurements of features includes causing graphical user interface widgets to be rendered at the at least one of the plurality of communication devices, each of the graphical user interface widgets including the at least a portion of the measurements of features in association with the user of the corresponding communication device.

6. The method of claim 5, wherein the graphical user interface widgets caused to be rendered at one of the plurality of communication devices display the measurements of features of the second signals of the audio signals received from the one of the plurality of communication devices relative to the measurements of features of the second signals of the audio signals received from other of the plurality of communication devices.

7. The method of claim 6, wherein one of the graphical user interface widgets is a timeline widget that scrolls contemporaneously with at least a portion of the multi-party dialog and graphically indicates when each of the users of the communication devices is participating in the dialog.

8. The method of claim 7, wherein the graphical user interface widgets caused to be rendered at one of the plurality of communication devices are rendered in a single graphical user interface.

9. The method of claim 8, wherein the single graphical user interface includes dialog data, the dialog data including one or more of: user identifiers associated with the users of the plurality of communication devices.

10. The method of claim 1, wherein the feedback data is used to provide one or more of tonal feedback, vocal feedback, haptic feedback, and color feedback to the plurality of communication devices.

11. The method of claim 1, wherein the performing one or more tests includes one or more of:
   (i) determining whether the plurality of communication devices include software or logic enabling the communication devices to digitally communicate and transmit audio signals for analysis; and
   (ii) checking the quality of the digital connections to ensure that they have sufficient bandwidth to transmit and receive the audio signals.

12. The method of claim 1, wherein the plurality of communication devices includes three or more communication devices.

13. A system for managing multi-party dialogs between communication devices, comprising:
   at least one memory; and
   a processor communicatively coupled to the at least one memory, wherein the processor is operable to:
   receive digital connection requests from a plurality of communication devices, the communication devices being connected over a plain old telephone service (POTS) connection;
   establish a digital connection with each of the plurality of communication devices;
   perform one or more tests on the plurality of communication devices;
   switch the connection between the communication devices from the POTS connection to the digital connections, enabling the communication devices to communicate with each other via the computing device (server) over the digital connections;
   receive audio signals from at least a portion of the plurality of communication devices, the audio signals being part of a multi-party dialog between users of the plurality of communication devices;
   split the received audio signals into corresponding first signals and second signals;
   transmit the first signals to the plurality of communication devices of the digital connections in the form of audio to be output by each of the communication devices; and
   transmit to at least one of the plurality of communication devices, feedback data comprising at least a portion of measurements of features of the second signals, the feedback data contextualizing each of the participation of the users of the plurality of communication devices during the multi-party dialog.

14. A method for managing multi-party dialogs, the method comprising:
   receiving, by a server connecting a first communication device, a second communication device, and a third communication device with each other over a first digital connection, a second digital connection, and a third digital connection with the second communication device and the third communication device, respectively, from the first communication device a first audio signal over the first digital connection; and
   providing, by the server, feedback data to the first communication device, the feedback data including measurements of features of the first audio signal, measurements of features of a second audio signal corresponding to the second communication device, and measurements of features of a third audio signal corresponding to the third communication device,
   wherein a multi-party dialog has been initiated, by a processor of the first communication device, with at least the second communication device and the third communication device, the first, second and third communication devices being connected over a plain old telephone service (POTS) connection;
   wherein a connection has been established, by the processor, with the server over the first digital connection; and
   wherein the first audio signal has been received, by the processor, from a user of the first communication device, the first audio signal including speech spoken by the user of the first communication device during at least a portion of the multi-party dialog.

15. The method of claim 14, wherein the measurements of the features of the first audio signal, the second audio signal, and the third audio signal include one or more of:
   (i) a measure of pace or articulation rate at which users associated with the first, second, and third audio signals have spoken over an interval of time;
   (ii) a measure of tone with which the users associated with the first, second, and third audio signals have spoken over an interval of time;
   (iii) a measure of vocal effort with which the users associated with the first, second, and third audio signals have spoken over an interval of time;
   (iv) a measure of amount of time the users associated with the first, second, and third audio signals have spoken over an interval of time; and
   (v) a measure of perceived depressed tone with which the users associated with the first, second, and third audio signals have spoken over an interval of time.

16. The method of claim 14, further comprising:
   determining the quality of the first audio signal; and
   if it is determined that the quality of the first audio signal is below a predetermined threshold: creating a copy of the first audio signal of a higher quality; and replacing the first audio signal with the copy of the first audio signal.

17. The method of claim 14, wherein the multi-party dialog has been initiated using a process comprising interfacing with the POTS connection via a public branch exchange (PBX) server.

\* \* \* \* \*